United States Patent [19]
Annacone et al.

[11] Patent Number: 5,487,931
[45] Date of Patent: Jan. 30, 1996

[54] RIGID DISC SUBSTRATE COMPRISING A CENTRAL HARD CORE SUBSTRATE WITH A HARD, THERMALLY AND MECHANICALLY MATCHED OVERLYING SMOOTHING LAYER AND METHOD FOR MAKING THE SAME

[76] Inventors: William R. Annacone, 52 Rockview Rd., Southport, Conn. 06490; Kenneth P. Felis, 150 Gay Bowers Rd., Fairfield, Conn. 06430; Dennis E. Speliotis, 22 Ingleside Rd., Lexington, Mass. 02173

[21] Appl. No.: 161,233

[22] Filed: Dec. 2, 1993

[51] Int. Cl.⁶ ..................... B32B 3/02
[52] U.S. Cl. ............ 428/64.1; 360/135; 428/65.5; 428/145; 428/149; 428/156; 428/172; 428/219; 428/220; 428/446; 428/450; 428/694 SG; 428/694 ST; 428/698; 428/704; 428/900; 428/928
[58] Field of Search ............ 428/694 ST, 694 SG, 428/64, 65, 149, 145, 156, 172, 219, 220, 446, 450, 698, 704, 900, 928; 360/135

[56] References Cited

U.S. PATENT DOCUMENTS 4,529,659  7/1985  Hoshino .................. 428/422
4,598,017  7/1986  Bayer ..................... 428/694 SG
4,738,885  4/1988  Matsumoto ................. 428/64

*Primary Examiner*—Nasser Ahmad
*Attorney, Agent, or Firm*—St. Onge Steward Johnston & Reens

[57] ABSTRACT

A rigid magnetic memory disc(28) is disclosed having a substantially flat, central hard core substrate(12) and an overlying smoothing layer(14) deposited thereon. The smoothing layer(14) is subsequently polished to a predetermined thickness. The smoothing layer(14) should be capable of having a surface finish better than approximately ten Angstroms Ra. After the smoothing layer(14) is polished, an appropriate magnetic medium(16) and alternately, a non-magnetic finishing layer(16) are then applied to the rigid disc substrate(10) as necessary, ultimately rendering a finished magnetic disc. The flatness of the underlying central hard core substrate(12) and the flatness and smoothness of the smoothing layer(14), the overlying magnetic medium(16) and the overlying finishing layer(18) allows the read-write head(24) to pass over the magnetic medium(16), or the finishing layer(18), if present, at both a substantially constant and substantially low flying height, thus increasing the areal density of the rigid magnetic memory disc(28). Preferably, the typical flying height of the read-write head(24) is approximately less than two and one-half microinches.

23 Claims, 1 Drawing Sheet

RIGID DISC SUBSTRATE COMPRISING A CENTRAL HARD CORE SUBSTRATE WITH A HARD, THERMALLY AND MECHANICALLY MATCHED OVERLYING SMOOTHING LAYER AND METHOD FOR MAKING THE SAME

TECHNICAL FIELD

The present invention relates to magnetic recording media, and in particular, to substrates which support the recording media and methods for making the same.

Typical magnetic recording utilizes a magnetic medium which magnetically stores the information. Different magnetic media are supported by different substrates. For example, a magnetic tape is supported by a flexible film. A floppy disc is supported by a similar, but slightly less flexible film. The present invention relates to rigid discs, which have traditionally been supported by aluminum and other "hard core" materials.

Each of these media, such as the magnetic tape, the floppy disc and the rigid disc, strive to maximize the amount of information stored by the medium. The amount of information stored is measured in bits stored per unit area, and is commonly referred to as areal density. The areal density is affected by both, the smoothness of the substrate surface, which underlies the magnetic medium, and the flatness of the substrate surface.

The magnetic medium is written on and read by a read-write head (also referred to as a recording head), which, in the case of rigid disc recording, ideally passes over a magnetic recording medium at either a very low and constant "flying height" or is actually in contact with the magnetic medium.

It is generally accepted that the signal received by the read-write head from the magnetic medium increases exponentially as the distance between the magnetic medium and the read-write head decreases. It is also generally accepted that the achievable areal density is directly proportional to the signal. Therefore, to optimize the areal density it is necessary to make the distance between the read-write head and the magnetic medium as small and uniform as possible.

The recording medium and the underlying substrates to date have had uneven surfaces, due to surface irregularities as herein discussed.

On a microscopic scale, disks have imperfections which generally resemble peaks and valleys. Consequently, the read-write head passes very close to, or contacts, the peaks of the magnetic medium, sometimes damaging or destroying both the head and the medium. Likewise, the read-write head passes far away from the magnetic medium at the valleys.

Another item of consideration is small holes in the surface of the substrate. Such small holes, or pits will also effectively result in an increase in distance between the read-write head and the magnetic medium.

It is desirable to make the substrate surface as smooth as possible to allow the read-write head to pass as close as possible to the magnetic medium, yet making this surface too smooth has its drawbacks. For example, when the smooth undersurface of the read-write head carrier (commonly known as a "slider") comes to rest on the smooth substrate surface, there is no air between the two surfaces and a vacuum bond results. This phenomenon is commonly referred to as "stiction" and it inhibits the proper performance of the disc drive upon start up.

On a macroscopic scale, disc flatness (warpage) is also a critical feature. As the surface becomes less flat, a surface resembling the undulations of a potato chip may result. Current disc rotational speeds of approximately 3500 revolutions per minute and higher are the norm. At these speeds such undulations in the disc surface can cause a "ski jump" effect off of these high areas in the axial tracking of the read-write head, resulting in an increased flying height on the lee side of these areas.

Rigid discs, which use aluminum NiP (which is aluminum coated with nickel phosphorus) to support the magnetic medium, do not allow the read-write head to pass as closely as desired to the magnetic medium surface. In the course of manufacture the aluminum disc is subsequently overcoated with the NiP material to produce a harder, more durable surface.

During processing the aluminum disc, which has a relatively low melting point, is heated to high temperatures, to render the desired properties in the magnetic medium. This heating causes the aluminum NiP substrate to warp in a manner dependent on the inherent orientation of its grain structure. Once aluminum NiP substrates have warped, it is virtually impossible to flatten them.

Another material much less commonly used as a rigid disc substrate is glass. Glass offers the ability to achieve very smooth surfaces, offering advantage over aluminum NiP in this category.

An induced stress known as "clamping force" occurs when finished magnetic discs are clamped into a disk drive assembly. Due to the relatively low stiffness of both glass and aluminum NiP, they tend to warp when placed under stress. Such is the case when these materials are clamped or rotated at high speeds in a disc drive assembly.

Due to the microscopic and macroscopic uneven surfaces of conventional magnetic discs, the read-write head is forced to pass over the magnetic medium at a flying height sufficient to avoid contacting the peaks. At this height, the read-write head passes far from the valleys of the magnetic medium. Thus, the areal density is not maximized.

Certain specific materials chosen from classes such as refractory hard metals or ceramics offer the potential for significant improvement in ultimate disc substrate properties when they are selected as the hard core material. Such ideal hard core materials have a low density, a high elastic modulus, a high tensile or crossbending strength, a low coefficient of thermal expansion, a high thermal conductivity, high hardness, and excellent resistance to deformation or degradation at high temperature.

The high elastic modulus (high stiffness) and high hardness of the ideal hard core materials allow discs made from these materials to be machined much flatter and to much closer tolerances than is typically possible with more conventional materials such as aluminum NiP or glass.

When using typical lapping or grinding equipment, to machine conventional (low stiffness) magnetic disc materials such as aluminum NiP or glass, the relatively flexible nature of the materials allows a disc, which is out of flatness, to bend and thus conform to the grinding device during grinding. As long as the grinding pressure is maintained the disc remains flat, but when the pressure is removed the disc returns to its original non-flat shape. The disc will be thinner after the grinding operation but will still not be flat.

On the other hand, when the subject hard core disc materials are ground, their high stiffness minimizes their tendency to deform during the grinding and lapping operations. Thus there is no "springback" or "memory" after the grinding operation, the absence of these problems allows the achievement of much flatter and closer tolerance discs.

Unfortunately, the hard core materials are brittle because of their high elastic modulus. Since they in turn have low fracture toughness they tend to chip around the edges or to show indications of porosity or pullouts during machining.

Defects such as these which lead to a rougher than desired surface can be largely eliminated by proper selection of manufacturing technique, such as for example chemical vapor deposition or by hot pressing at relatively high pressures. However manufacturing processes such as these are not feasible to consider for fabricating hard core disc materials because of their prohibitively high costs compared to the value of such discs in the commercial marketplace.

So while one would desire, in order to increase areal density, to use a rigid, hard disc material that has been ground flat and polished to a very smooth surface, the high costs of such discs prevents their use.

It is desirable, therefore, to prepare a substrate for use in preparation of a magnetic recording rigid disc which exhibits the advantages of use of an inexpensive, high stiffness, central hard core material while providing a smooth surface which allows for a constant and low flying height by the read-write head, thus maximizing the areal density.

SUMMARY OF THE INVENTION

The present invention presents a mechanism whereby, through the use of a layered composite disc, the mechanical advantages of a central hard core substrate are combined with the polishing advantages of a mechanically and thermally matched overlying smoothing layer. This layered composite disc substrate allows the use of economical processing and manufacturing techniques, permitting the introduction of a cost effective disc substrate ready for magnetic processing (such a disc is hereinafter referred to as a "rigid disc substrate") into the marketplace.

Accordingly, it is an object of the present invention to provide a central hard core substrate which has a high degree of stiffness and which can be ground to extreme flatness.

It is then the object of the present invention to present a rigid disc substrate consisting of a central hard core substrate and an overlying smoothing layer the combination of said central hard core substrate and smoothing layer yielding finished magnetic disc substrates that allow extremely low flying heights and accordingly extremely high areal densities.

It is further the object of the present invention to describe a method whereby a very high quality yet low cost rigid disc substrate may be manufactured by a combination of steps consisting of:

1. the formation of a central hard core substrate using relatively low cost methods and
2. the formation of a mechanically and thermally matched high quality, low cost surface smoothing layer that can be easily polished to very smooth surface finishes.

It is another object of the present invention to provide a smoothing layer which maintains the advantages of a central hard core substrate, while still yielding a smooth surface.

It is another object of the present invention to provide a smoothing layer which is thermally stable and thermally compatible with the central hard core substrate.

It is another object of the invention to provide a rigid disc substrate which when further processed by adding the magnetic or the magnetic and finishing layers will form a "finished magnetic disc" (a finished magnetic disc is herein defined as the magnetic disc ready for use in a magnetic rigid disc drive) in which the read-write head can pass over the magnetic medium at a constant flying height.

It is still another object of the present invention to provide a rigid disc substrate which when further processed by adding the magnetic or the magnetic and finishing layers will form a finished magnetic disc in which the read-write head can pass over the magnetic medium at a low flying height or in contact with the magnetic medium.

It is another object of the present invention to provide a rigid disc substrate which when further processed by adding the magnetic or the magnetic and finishing layers will form a finished magnetic disc which can be prepared with a shallow relief texture to overcome stiction.

It is yet another object of the present invention to provide a rigid disc substrate which when further processed by adding the magnetic or the magnetic and finishing layers will form a finished magnetic disc which yields a high areal density.

To overcome the deficiencies of the prior art and to achieve the objects and advantages listed above, Applicants disclose a rigid disc substrate, comprised of a rigid central hard core substrate material, such as silicon carbide, with an overlying smoothing layer such as crystalline silicon that can be polished to a very smooth surface finish. A magnetic medium, whose surface mimics its underlayer, is formed over the smoothing layer. This yields a smooth magnetic medium surface with substantially reduced peaks and valleys, undulations and holes. As such, the read-write head is able to pass over the magnetic medium at both a constant and a low flying height, thus maximizing the areal density.

In particular, the finished magnetic disc is prepared by first forming a hard core substrate. This hard core substrate can be made of any suitable substrate material with an elastic modulus greater than 35 million pounds per square inch or a specific stiffness (defined as elastic modulus divided by specific gravity) greater than 12 million pounds per square inch, as for example silicon carbide.

After the hard core substrate is formed, a smoothing layer such as for example crystalline silicon, is formed over this central hard core substrate. This layer is then polished to a smoothness of less than approximately ten Angstroms roughness average (Ra). Ra is defined as the arithmetic average of the deviation of all roughness average readings from a predetermined centerline.

After the crystalline silicon layer is formed and polished, a magnetic medium and, optionally, other appropriate "protective" or "lubricating" layers (herein referred to as "finishing layers") are formed over the crystalline silicon layer. Because of the smoothness of the underlying crystalline silicon smoothing layer, the magnetic medium as deposited has greatly reduced peaks and valleys and because of the flatness and stiffness of the central hard core substrate now, therefore, the read-write head is capable of passing over the magnetic medium at both a constant and a low flying height. Preferably, the flying height is less than approximately two and one-half microinches above the magnetic medium. As such, this flying height maximizes the areal density.

Figure 1:
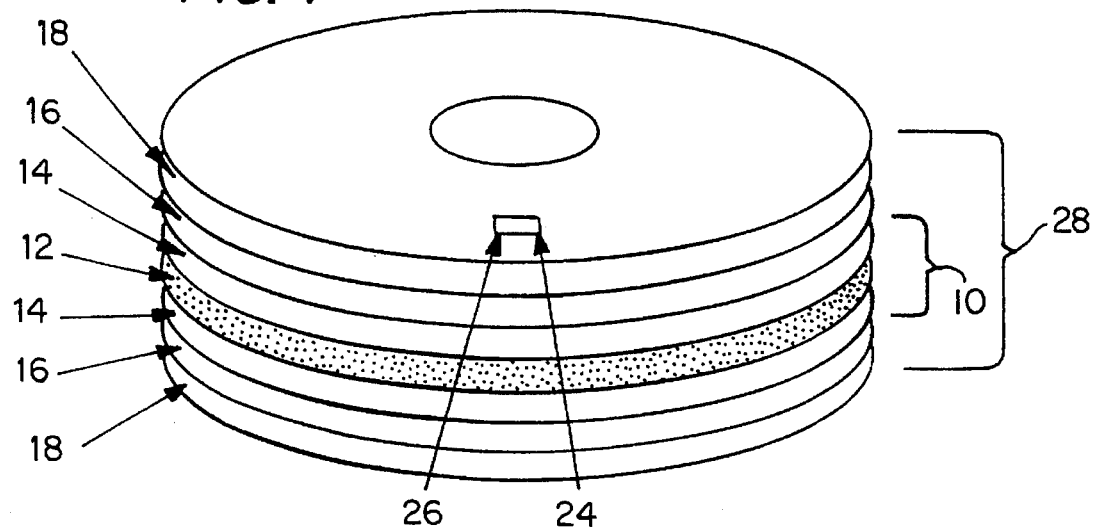
FIG. 1 is a cross sectional view of a finished magnetic disc, greatly exaggerated in thickness, showing a central hard core substrate and an overlying smoothing layer, constructed in accordance with the present invention. Additionally there are a magnetic medium layer, a finishing layer, and a read-write head mounted on a slider.

| Reference Numerals In Drawings | |
|---|---|
| 10 Rigid disc substrate | 12 Central hard core substrate |
| 14 Smoothing layer | 15 Smoothed smoothing layer |
| 16 Magnetic layer | 18 Finishing layer |
| 20 Texture grooves | 22 Plateaus |
| 24 Read-write head | 26 Slider |
| 28 Finished magnetic disc | |

DETAILED DESCRIPTION OF THE INVENTION

Figure 2:
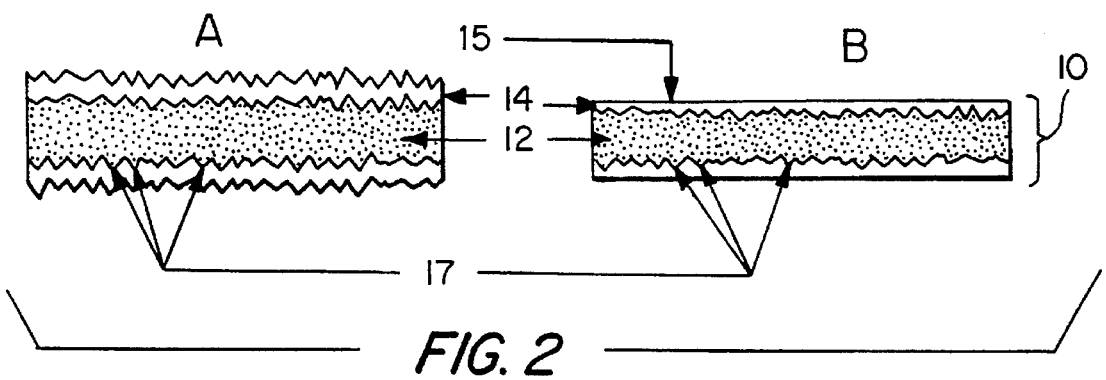
FIG. 2 is an enlarged cross sectional view of a segment of a rigid disc substrate showing a central hard core substrate and a smoothing layer that is as formed (A) and as smoothed (B)
Figure 3:
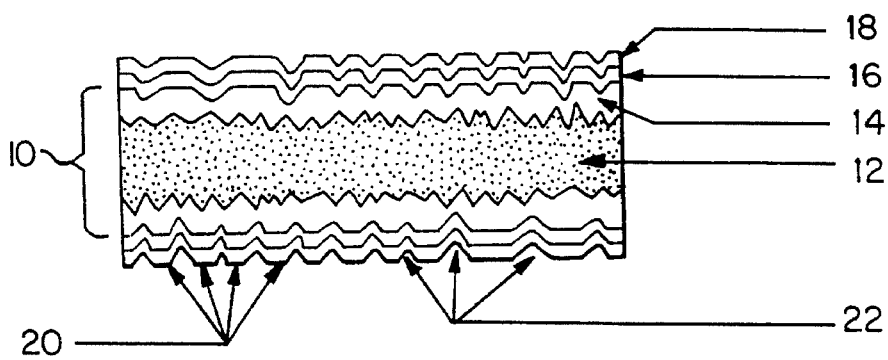
FIG. 3 is an enlarged cross sectional view of a segment of a finished magnetic disc, showing a central hard core substrate, a texturized overlying smoothing layer—constructed in accordance with the present invention, a magnetic medium layer and a smoothing layer.

Referring to the drawings in detail, the invention is shown and generally designated by the reference numeral 10. As shown in FIGS. 1, 2, 3 the invention basically includes a central hard core substrate 12, with an overlying smoothing layer 14 (this combination comprises a rigid disc substrate 10), onto which (FIGS. 1 & 3) an overlying magnetic medium layer 16 and a finishing layer 18 may be applied. The combination of 12, 14, 16 & 18 comprise a finished magnetic disc 28.

Regarding the discussion of the disc herein, it should be understood that the rigid disc substrate 10 is double-sided. As such, layers are formed on both sides of the rigid disc substrate 10 and those layers are generally symmetrical. It should also be understood that the rigid disc substrate 10 can be any substantially flat mender, which can be slightly concave or convex, as the user desires. Such radial deviations from flatness (which render the discs truly spherical in shape) may be tolerated and at times are desirable—however axial deviations from flatness which render the rigid disc substrate warped or ashperic ("potato-chipped") in shape are undesirable.

The central hard core substrate 12, which is typically 0.012 inches to 0.050 inches in thickness, is capable of supporting the surface smoothing layer 14, and in turn both the magnetic medium layer 16 and the finishing layer 18. In the preferred embodiment the central hard core substrate 12 should be a material with high elastic modulus; low theoretical density; low, fine and uniformly distributed porosity; low coefficient of thermal expansion; high hardness; and fine grain size.

The high elastic modulus permits machining of the central hard core substrate 12 to very accurate flatness tolerances.

The low density combines with the high elastic modulus to provide a high specific stiffness (elastic modulus divided by specific gravity). A high specific stiffness in turn, is desirable since it allows the finished magnetic disc 28 to be spun at high rotational speeds (revolutions per minute) while remaining flat and at the same time consuming only minimal power to rotate the disc.

A low, fine and uniformly distributed porosity is desirable since for any given material the lower, finer, and more uniformly distributed the porosity, the smoother the surface finish that can be polished onto the rigid disc substrate. Remembering however, that one of the objects of the present invention is to overcome the need for zero porosity in the rigid disc substrate material and to thus allow the use of relatively inexpensive substrate manufacturing processes and in turn relatively inexpensive rigid disc substrates.

A low coefficient of thermal expansion is desirable in order to reduce dimensional changes that may occur in subsequent rigid disc substrate thermal processing or in actual use.

A high hardness and fine grain size are desirable in order to maintain a more uniform and scratch free rigid disc substrate surface for subsequent formation of the described smoothing layer.

The smoothing layer 14, which is typically less than 40 microns in thickness, is in intimate contact with and tightly bonded to the central hard core substrate. It provides an extremely smooth surface 15 for support of the magnetic medium 16.

In the preferred embodiment the smoothing layer 14 closely matches the thermal expansion of the central hard core substrate 12, has extremely fine grain size, and zero porosity, and is a material which can be conveniently polished to a smooth flat surface 15, with essentially no pullouts or other polishing defects.

While the central hard core substrate could be selected from any rigid (high elastic modulus) material, such as high modulus metals, refractory hard metals, ceramics, and certain glasses or glass ceramics (such as for example those manufactured by Corning Inc. of Corning, N.Y., under the trade names CANASITE and MEMCOR) in the preferred embodiment the central hard core substrate is selected from materials that have an elastic modulus greater than 35 million psi (pounds per square inch) such as those shown in TABLE A.

TABLE A

| | Central Hard Core Substrates | | | | |
|---|---|---|---|---|---|
| Property data | silicon carbide SiC | aluminum nitride AlN | boron carbide B4C | silicon nitride Si3N4 | Titanium diboride TiB2 |
| Thermal expansion (ppm/degC.) | 4.83 | 4.84 | 4.78 | 2.11 | 5.4 |
| Thermal conductivity (cal/cm sec degC.) | 0.41 | 0.07 | 0.07 | 0.07 | 0.06 |
| Hardness (Knoop) | 2,700 | 1,230 | 2,800 | 2,000 | 2,600 |
| Elastic modulus (Mpsi) | 54 | 50 | 65 | 40 | 74 |
| Specific gravity | 3.21 | 3.28 | 2.52 | 3.21 | 4.55 |
| Specific stiffness (Mpsi) | 16.8 | 15.2 | 25.8 | 12.5 | 16.3 |

Likewise, while the smoothing layer could be selected from a wide range of polishable materials that mate thermally and mechanically with the central hard core substrate, in the preferred embodiment the smoothing layer is selected from materials (such as those shown in TABLE B) that are hard, have temperature stability in excess of 600 degrees Celsius, are easily polished and have thermal expansion coefficients less then 2.5 times that of the central hard core substrate.

Applicants have discovered that crystalline materials, such as those listed in TABLE B, can provide cost effective, adequate though less perfect smoothing layers than amorphous silicon.

In a pending patent application (same Applicants, Ser. No. 08/090,746, filing date Jul. 13, 1993), Applicants disclose a smoothing layer consisting of amorphous silicon. The present invention relates to crystalline smoothing layer material (non-amorphous). Such crystalline materials discussed herein exhibit properties similar to amorphous silicon (i.e. polishability, thermal characteristics, hardness, porosity and adhesion), providing acceptable smoothing layers. Ultimately, amorphous silicon can be made smoother easier than the crystalline materials, making it the ideal material, however the crystalline materials are capable of satisfying present demands in the marketplace.

TABLE B

| | Smoothing Layers | | | | |
|---|---|---|---|---|---|
| Property data | crystalline silicon Si | titanium carbide TiC | boron B | titanium nitride TiN | titanium carbo-nitride |
| Thermal expansion (ppm/degC.) | 4.63 | 6.52 | x | 9.35 | 8.5 |
| Thermal conductivity (cal/cm sec degC.) | x | 0.06 | x | 0.07 | 0.06 |
| Hardness (Knoop) | x | 2,470 | x | 1,770 | 2,250 |
| Elastic modulus (Mpsi) | x | 63 | x | x | x |
| Specific gravity | 2.32 | 4.93 | x | 5.43 | x |
| Specific stiffness | x | 12.8 | x | x | x |

The smoothing layer 14 can be deposited onto the central hard core substrate 12 by any suitable method. The choice of the central hard core substrate 12 determines the application process. Typical application processes include: microwave-assisted plasma vapor deposition, plasma assisted vapor deposition, chemical assisted vapor deposition, vacuum vapor deposition, laser ablation, ion plating, high frequency ion plating, ion cluster beam, ion beam deposition, sputtering, chemical vapor deposition (CVD), electron beam plasma-assisted vapor deposition, and electron beam physical vapor deposition.

As illustrated in FIG. 2, the thickness of the smoothing layer 14 formed on the central hard core substrate 12 is determined by the height of the peaks 17 of the hard core material 12. The thickness of the smoothing layer 14 must be sufficient to adequately build-up the valleys or any pores, pits, pullouts or other grinding or lapping defects to a level slightly higher than the highest peak of the central hard core substrate 12 leaving enough material above the highest peak for smoothing purposes.

The central hard core substrate is selected as a compromise of end product requirements such as cost, performance, and availability. The smoothing layer is selected based on the choice of central hard core substrate material, and the same compromise of end product requirements. The smoothing layer must be tightly adhered to the central hard core substrate and should be relatively closely matched in thermal expansion. Materials with unacceptably dissimilar coefficients of thermal expansion may crack when exposed to broad temperature ranges, as may at times be-encountered in the process of deposition of thin film magnetic media.

A typical selection of a central hard core substrate material would be silicon carbide. As can be seen from TABLE A this material has a high elastic modulus, low density, high hardness, and low thermal expansion. Silicon carbide products can be formed by a wide variety of manufacturing processes including but not limited to chemical vapor deposition, pressure assisted densification (hot pressing), reaction bonding, sintering, recrystallization, and several other less common processes known to those skilled in the art. Disc substrates made by any of these processes could be considered candidates for the application of a smoothing layer.

However a much larger savings in cost can be achieved by selecting a material such as reaction bonded or sintered silicon carbide as the silicon carbide material for the central hard core substrate. Central hard core substrates produced by these processes have the advantage of being formed to near net shape and being relatively inexpensive to produce. However in both cases the surfaces of these central hard core substrates are very difficult to polish to a very smooth surface finish owing to the microstructure of the materials.

In the case of sintered silicon carbide, the material contains approximately 1 to 5 percent residual porosity which is not eliminated in the sintering process. The pores that are present vary in size, but in all but the lowest quality magnetic discs, are too large to allow the sintered silicon carbide to be used as a central hard core substrate.

However the application of a smoothing layer such as crystalline silicon, will render the surface of the rigid disc substrate easily polishable and will allow the comparatively easy attainment of surface finishes better than 10 Angstroms Ra. Thus the combination of a sintered silicon carbide central hard core substrate and an easily polishable crystalline silicon smoothing layer allow the production of an exceedingly high quality rigid disc substrate at a cost low enough to be very attractive in the market place.

In a similar case, using reaction bonded silicon carbide as the basic material, while cost effective to produce, is not suitable as a high quality central hard core substrate because of the great difficulty in polishing the material.

In the case of reaction bonded silicon carbide the problem lies in the fact that while the material has no residual porosity, it is a mixture of two materials with dissimilar hardness—silicon carbide and silicon. This two phase nature is a result of the reaction bonding process and results in an undesirable differential polish of the surface, since the exposed silicon on the surface polishes away faster than the exposed silicon carbide at the surface.

Once again however, the application of a smoothing layer, such as crystalline silicon, renders the surface of the rigid disc easily polishable and allows the comparatively easy attainment of surface finishes better than 10 angstrom Ra. Thus the combination of a reaction bonded silicon carbide central hard core substrate and an easily polishable crystalline silicon smoothing layer will allow the production of an exceedingly high quality rigid disc substrate at a cost low enough to be very attractive in the market place.

Similar arguments can be made for the application of the same or other smoothing layers (such as those in table B) to other central hard core substrate materials (such as those indicated in table A). In each case the benefit is that the combination allows the use of a less expensive but high quality central hard core substrate material which provides the desired mechanical properties to the finished rigid disc substrate, and an inexpensive relatively easily polished surface smoothing layer which yields the extreme smoothness required to achieve state of the art high areal density magnetic media.

Advantageously, the as formed smoothing layer 14 is smoothed 15 (FIGS. 2, A & B) by any suitable method such as polishing, ion beam milling, chemical etching or combinations thereof. The smoothing layer is reduced to a predetermined smoothness sufficient to provide a smooth surface 15 upon which the magnetic medium 16 is applied. Preferably, this smoothness is approximately less than ten Angstroms Ra. The smoothing layer materials of Table B have the ability to be polished to a high degree of smoothness by mechanical/chemical means, speeding the process and resulting in a great deal of precision.

The combination of certain central hard core substrate materials, for example silicon carbide, and certain smoothing layer materials such as crystalline silicon lend themselves quite well to the requirements of high temperature processing (which can sometimes exceed five hundred fifty degrees Celsius). For example, sputtering can include temperatures this high. The ceiling temperature of crystalline silicon combined with high temperature central hard core substrate material such as silicon carbide, is well in excess of the required process temperatures.

Although the surface smoothing layer 14 is reduced to a flat smooth state 15, current rigid magnetic disc technology commonly uses texturized substrates (FIG. 3). If the smoothing layer is not texturized, then the finished magnetic disc surface (which is the combination of the rigid disc substrate 10, magnetic layer 16 and finishing layer 18 deposited in a manner that mimics the surface of the smoothing layer 14) and the smooth undersurface of the read-write head slider can develop stiction. Texturizing can be accomplished in any suitable manner, such as:

1) randomly scratching the finished smoothing layer 15 with extremely thin, shallow grooves 22) typically 100–1000 Angstroms deep), for example, by any appropriate method, such as abrasive tape or slurry, or chemical or plasma etch, or 2) building up the finished smoothing layer by the deposition of a thin film of a material, such as chromium, in a pattern sufficient to create a relief pattern. The preferable relief would be of sufficient depth and length to allow air or fluid beneath the slider to minimize stiction. This relief is preferably 100–1000 Angstroms.

It is important to note that texturizing maintains smoothness on the top of resulting plateaus 20. Accordingly, this will not adversely affect the flying height of current rigid disc assemblies.

The magnetic medium 16 can be any magnetic medium known to the artisan. Suitable media include ferromagnetic and ferrimagnetic materials. Especially preferred classes of materials are magnetic metal film compounds containing chromium-cobalt-tantalum, chromium-cobalt-platinum or certain oxides such as the hexaferrites. The magnetic medium is preferably supported by any suitable enhancing underlayer material which is generally considered part of the magnetic layer. Chromium is commonly used to enhance magnetic properties and promote adhesion. The magnetic medium 16 can be applied to the surface smoothing layer 14 by any suitable method, such as by thin film sputtering. After the magnetic medium 16 has been applied, it preferably has a thickness of approximately 100 to 3000 Angstroms.

Additionally, finishing layers 18, shown in FIGS. 1 & 3 may be formed over the magnetic medium 16 to further enhance the performance of the disc. Examples of these finishing layers include carbon overlayers, protective layers and lubricating layers. Combined, these finishing layers are typically less than 250 Angstroms thick.

It should be understood by those skilled in the art that the rigid disc substrate 10 is suitable for use as a magnetic disc, with or without the additional finishing layers 18, so long as the magnetic medium 16 exists.

Referring to FIG. 1, the magnetic medium 16 is read by and written upon by a read-write head 24 mounted on a slider 26, which flies over the magnetic medium. Because the surface smoothing layer 14 is very durable, should the slider 26 contact the magnetic medium, the surface smoothing layer 14 is hard enough to support the magnetic layer 16 and provide a high resistance to indentation by the slider.

A means of practicing the present invention can be described as follows:

First, a block of silicon carbide can be made, by any appropriate method, such as uniaxial hot pressing, reaction bonding or sintering. A circular shape is then cut from this sheet or block by any suitable method, such as with the use of a diamond saw. After determining the desired size of the finished disc, an approximately-sized outer diameter is ground on a centerless grinder, the outer diameter being slightly larger than the outer diameter required for the finished product. A center hole having an inner diameter is then made of approximately the correct size by any suitable means, such as on a vertical spindle machine using conventional coolants. The inner diameter is cut to the exact size using, for example, a resin bond diamond insert and conventional cutting fluids.

After cutting both the outer and inner diameters, the silicon carbide is placed on a mandrel, referencing the inner diameter. Then, the exact desired outer diameter size is made, using, for example, a plunge grinder and conventional cutting fluids. The resulting tube is then sliced to near net thickness via a diamond or wire saw. Suitable methods, such as lapping and/or polishing, are then used to flatten and smoothen the device.

Alternatively, the core material can be molded, sintered, reaction bonded or siliconized to near net shape and then lapped or polished flat. The near net shaped discs can then be stacked to form a tube and processed as described above.

Additionally, sheets of silicon carbide can be formed. These sheets can be scribed or cut with a Nd:YAG laser (manufactured by Coherent General of Sturbridge, Mass.) for instance. The cut shape would preferably be near net and ID-OD processed in stacks as previously outlined.

The resulting hard core substrate 12 is then thoroughly cleaned in preparation for the deposition of a crystalline silicon smoothing layer 14. Crystalline Silicon can be deposited, for example, using a plasma assisted vapor deposition process, to a thickness of approximately 0.001 inch on the hard core substrate 12 surface.

The crystalline silicon smoothing layer 14 is then polished by any suitable means, such by an AC 1200 Polisher, manufactured and made by Peter Wolters of America, Inc. located at Plaineville, Mass. This crystalline silicon smoothing layer 14 should be polished with temperature controlled platters, such as by using "Suba 500 TM" polishing pads, and approximately a 10:1 dilution of deionized water to colloidal silica slurry at a pH of approximately 10.5–12.5, using about five psi pressure, at roughly fifty rpm, at generally fifty degrees Celsius for about ten minutes. This is followed by deionized water flushing.

The polishing can be finished on the same machine with "Polytech Supreme" polishing pads and about a 30:1 dilution of deionized water to colloidal silica slurry at a pH of approximately 10.5–12.5, using about five psi pressure, at generally fifty rpm, at approximately fifty degrees Celsius, for about fifteen minutes followed by a deionized water flush. Preferably, this provides a surface finish of less than approximately ten Angstroms Ra. For even better surfaces, the finishing polish can be run longer with a lower slurry concentration.

After the crystalline silicon 14 has been polished, it can optionally be texturized, for instance on an Oliver Texturizer (manufactured by Oliver Design Corporation of Scotts Valley, Calif.), to prevent stiction.

The resulting rigid disk substrate 10 sufficiently overcomes the problems previously experienced by providing a substantially flat central hard core substrate 12 with an overlying crystalline silicon smoothing layer 14. Since the crystalline silicon smoothing layer 14 retains imparted flatness and can become very smooth, the overlying thin film deposited recording medium 16 is likewise smooth. This allows the read-write head 24 to pass over the magnetic medium 16 and any additional finishing layer 18 at both a substantially constant and a substantially low flying height. Accordingly, areal density is increased over conventional discs. (It should be understood that if no finishing layers 18 were applied to the magnetic medium 16, then the read-write head 24 would pass over the magnetic medium 16 at substantially a constant height of approximately less than two and one-half microinches.)

The preferred embodiments of the present invention are illustrated by the following examples:

EXAMPLE 1

A piece of silicon carbide, manufactured by a uniaxial pressure assisted densification process, was machined and ground to provide a central hard core substrate 65 mm OD by 20 mm ID by 0.033" thick. This disc was lapped, then examined, using a Zygo Corporation (located in Middlefield, Conn.) interferometer to determine the size and distribution of imperfections in the part that would subsequently have an effect on surface polishing. The results of this test showed random porosity as follows: 1) 5–8 micron diameter by 2–3 microns deep with a frequency of less than a hundred per disc side, and 2) pits as large as 35 micron diameter by 10 microns deep. The disc was then polished. Polishing typically removes 1–2 microns of material—not sufficient to overcome the imperfections. When tested in a disc drive, the surface exhibited read-write head flying heights of five plus microinches. These imperfections also constitute an unacceptable amount of magnetic dropout errors in the finished disc. Based on these measurements, a smoothing layer of crystalline silicon 25 microns thick was deposited on the surface of the silicon carbide hard core substrate. This smoothing layer was then polished using conventional high speed polishing techniques and then measured on a Zygo interferometer. The results of these tests showed a surface finish of 1.6 Angstroms Ra with no detectable pits or porosity. This finish produced flying heights less than 2.5 microinch with acceptable magnetic error.

EXAMPLE 2

A disc, for use as a central hard core substrate, 65 mm OD by 20 mm ID by 0.033" thick of sintered silicon carbide (manufactured by a sintering process in which alpha SiC (silicon carbide) powder is mixed with minor amounts of carbon and boron—other sintered SiC's as for example those using beta SiC powder and or other sintering aids such as aluminum could also be used) was obtained. This disc was lapped, then examined, using a Zygo interferometer to determine the size and distribution of imperfections in the part that would subsequently have an effect on surface polishing. The results of this test showed random porosity as follows: 1) 5–12 micron diameter by 2–5 microns deep with a frequency of less than a hundred per disc side, and 2) pits as large as 60 micron diameter by 16 microns deep. The disc was then polished. Polishing typically removes 1–2 microns of material—not sufficient to overcome the imperfections. When tested in a disc drive, the surface exhibited read-write head flying heights of five plus microinches. These imperfections also constitute an unacceptable amount of magnetic dropout errors in the finished disc. Based on these measurements, a smoothing layer of crystalline silicon 35 microns thick was deposited on the surface of the silicon carbide (hard core) disc substrate. This smoothing layer was then polished using conventional high speed polishing techniques and then measured on a Zygo interferometer. The results of these test showed a surface finish of 1.6 Angstroms Ra with no detectable pits or porosity. This finish produced flying heights less than 2.5 microinch with acceptable magnetic error.

EXAMPLE 3

A disc for use as a central hard core substrate, 65 mm OD by 20 mm ID by 0.033" thick of reaction bonded silicon carbide (manufactured by a process in which the silicon carbide is mixed with small amounts of carbon and densified by reacting in the presence of molten or,gaseous silicon) was obtained. This disc was lapped, then examined, using a Zygo interferometer to determine the size and distribution of imperfections in the part that would subsequently have an effect on surface polishing. The results of this test showed random porosity as follows: 1) 5–8 micron diameter by 2–3 microns deep with a frequency of less than a hundred per disc side, and 2) pits as large as 35 micron diameter by 10 microns deep. The disc was then polished. Polishing typically removes 1–2 microns of material—not sufficient to overcome the imperfections. When tested in a disc drive, the surface exhibited read-write head flying heights of five plus microinches. These imperfections also constitute an unacceptable amount of magnetic dropout errors in the finished disc. Based on these measurements, a smoothing layer of crystalline silicon 25 microns thick was deposited on the surface of the silicon carbide disc substrate. This smoothing layer was then polished using conventional high speed polishing techniques and then measured on a Zygo interferometer. The results of these test showed a surface finish of 1.6 Angstroms Ra with no detectable pits or porosity. This finish produced flying heights less than 2.5 microinch with acceptable magnetic error. TABLE C is an abbreviated continuation of Applicants results of high elastic modulus hard core substrate materials with a crystalline silicon smoothing layer.

TABLE C (all units in microns)

| Example# Material | Process description | Pore diameter | Pore depth | Pit diameter | Pit depth | Smoothing layer thickness |
|---|---|---|---|---|---|---|
| 4 Boron carbide | reaction bonded *4 | 6–12 | 4–5 | 35 | 12 | 25 |
| 5 Silicon nitride | reaction bonded *5 | 8–20 | 4–15 | 45 | 20 | 45 |
| 6 Silicon nitride | sintered *6 | 12–24 | 8–16 | 45 | 20 | 35 |
| 7 Silicon nitride | sintered reaction bonded*7 | 3–8 | 3–5 | 20 | 10 | 25 |
| 8 Boron carbide | LP** uniaxial hot pressed | 3–10 | 5–6 | 20 | 10 | 25 |
| 9 Aluminum nitride | LP** uniaxial hot pressed | 3–8 | 4–5 | 25 | 15 | 25 |
| 10 Boron carbide | sintered *10 | 10–25 | 8–15 | 35 | 20 | 35 |

TABLE C- expanded process descriptions
*4 manufactured by a process in which the boron carbide is mixed with small amounts of carbon and densified by reacting in the presence of molten or gaseous silicon
*5 manufactured by a process in which silicon metal is reacted in situ with gaseous nitrogen
*6 manufactured by a process in which silicon nitride powder is sintered using aluminum oxide and yttrium oxide as additives
*7 manufactured by a process in which silicon metal is mixed with aluminum oxide and yttrium oxide sintering aids and then is reacted in situ with gaseous nitrogen and further heated under hot gas isostatic pressure so as to cause densification from the effect of the sintering aids
*8,*9 low pressure uniaxial hot pressing
*10 manufactured by a process by which boron carbide powder is mixed with minor amounts of carbon and boron or other sintering aids such as aluminum could also be used
**Low Pressure

EXAMPLES 11–20

In these examples the central hard core substrate materials of examples 1–10 were overcoated with a smoothing layer of titanium nitride instead of crystalline silicon. In each case a smoothing layer thickness approximately 5–10 microns thicker than that used for crystalline silicon was applied. The resulting hard core material with a titanium nitride smoothing layer was polished using conventional methods. In each case the surface observed for the titanium nitride was rougher than that obtained for the crystalline silicon (roughnesses were in the range of 2–4 angstroms Ra) but in each case the finishes were well within the range required to produce flying heights less than 2.5 microinches.

EXAMPLES 21–30

In these examples the hard core materials of examples 1–10 were overcoated with a smoothing layer of titanium carbide instead of crystalline silicon. In each case a smoothing layer thickness approximately 5–10 microns thicker than that used for crystalline silicon was applied. The resulting hard core material with a titanium nitride smoothing layer was polished using conventional methods. In each case the surface observed for the titanium carbide was rougher than that obtained for the crystalline silicon (roughnesses were in the range of 4–8 angstroms Ra) but in each case the finishes were within the range required to produce flying heights less than 2.5 microinches.

EXAMPLES 31–40

In these examples the hard core disc materials of examples 1–10 were overcoated with a smoothing layer of titanium carbo-nitride instead of crystalline silicon. In each case a smoothing layer thickness approximately 5–10 microns thicker than that used for crystalline silicon was applied. The resulting hard core material with a titanium carbo-nitride smoothing layer was polished using conventional methods. In each case the surface observed for the titanium carbo-nitride was rougher than that obtained for the crystalline silicon (roughnesses were in the range of 4–8 angstroms Ra) but in each case the finishes were within the range required to produce flying heights less than 2.5 microinches.

The described invention sufficiently overcomes the problems previously experienced in providing a cost effective thermally and mechanically stable disc with surface finishes sufficient to allow flying heights of less than 2.5 microinches by providing a substantially flat central hard core substrate with an overlying smoothing layer. Because the smoothing layer is thin compared to the thickness of the central hard core substrate it does not detract from the mechanical properties of the central hard core substrate. And because the smoothing layer can be polished to a very smooth surface finish, the overlying applied magnetic medium is likewise smooth. This combination allows the read-write head to pass over the magnetic medium and any additional layers at a flying height that is both low and consistent, producing finished discs capable of future demands.

It should be understood by those skilled in the art that obvious modifications can be made without departing from the spirit of the invention. Accordingly, reference should be made primarily to the accompanying claims, rather than the foregoing specification, to determine the scope of the invention.

Applicants claim:

1. A rigid disc substrate capable of supporting a magnetic medium thereon, which comprises a central hard core substrate having a hardness of at least about 1230 Knoop, the hard core substrate consisting of a silicon carbide material having no unbound silicon and having an overlying smoothing layer thereon.

2. The rigid disc substrate of claim 1, wherein the central hard core substrate comprises a material having a specific stiffness greater than about 12 million pounds per square inch.

3. The rigid disc substrate of claim 2, wherein the central hard core substrate comprises a material having an elastic modulus greater than about 35 million pounds per square inch.

4. The rigid disc substrate or, claim 1, wherein the smoothing layer has a thermal expansion coefficient between about 40% and about 250% of the thermal expansion coefficient of the central hard core substrate.

5. The rigid disc substrate of claim 4, wherein the smoothing layer is thermally stable at temperatures of at least about 600 degrees Celsius.

6. The rigid disc substrate of claim 5, wherein the smoothing layer is formed of a material selected from the group consisting of amorphous silicon, crystalline silicon, titanium carbide, boron, titanium nitride, titanium carbo-nitride and mixtures or combinations thereof.

7. The rigid disc substrate of claim 6, wherein the smoothing layer has a surface roughness that is smoother than about ten Angstroms Ra.

8. The rigid disc substrate of claim 5, wherein a predetermined area of the smoothing layer is texturized sufficiently to prevent stiction.

9. A rigid disc substrate capable of supporting a magnetic medium thereon, which comprises a central hard core substrate having a hardness of at least about 1230 Knoop, the central hard core substrate consisting of a silicon carbide material having no unbound silicon and a smoothing layer on both sides thereof.

10. The rigid disc substrate of claim 9, wherein the central hard core substrate comprises a material having a specific stiffness greater than about 12 million pounds per square inch.

11. The rigid disc substrate of claim 10, wherein the central hard core substrate comprises a material having an elastic modulus greater than about 35 million pounds per square inch.

12. The rigid disc substrate of claim 9, wherein the smoothing layer has a thermal expansion coefficient between about 40% and about 250% of the thermal expansion coefficient of the central hard core substrate.

13. The rigid disc substrate of claim 12, wherein the smoothing layer is thermally stable at temperatures of at least about 600 degrees Celsius.

14. The rigid disc substrate of claim 13, wherein the smoothing layer is formed of a material selected from the group consisting of amorphous silicon, crystalline silicon, titanium carbide, boron, titanium nitride, titanium carbo-nitride and mixtures or combinations thereof.

15. The rigid disc substrate of claim 14, wherein the smoothing layer has a surface roughness that is smoother than about ten Angstroms Ra.

16. The rigid disc substrate of claim 13, wherein a predetermined area of the smoothing layer is texturized sufficiently to prevent stiction.

17. A rigid disc substrate capable of supporting a magnetic material thereon, which comprises a central hard core substrate consisting of a silicon carbide material having no unbound silicon, and having a hardness of 1230 Knoop and an overlying smoothing layer, wherein the smoothing layer has a surface roughness which is smoother than about 10 Angstroms Ra.

18. The rigid disc substrate of claim 17, wherein the central hard core substrate comprises a material having a specific stiffness greater than about 12 million pounds per square inch.

19. The rigid disc substrate of claim 18, wherein the central hard core substrate comprises a material having an elastic modulus greater than about 35 million pounds per square inch.

20. The rigid disc substrate of claim 17, wherein the smoothing layer has a thermal expansion coefficient between about 40% and about 250% of the thermal expansion coefficient of the central hard core substrate.

21. The rigid disc substrate of claim 20, wherein the smoothing layer is thermally stable at temperatures of at least about 600 degrees Celsius.

22. The rigid disc substrate of claim 21, wherein the smoothing layer is formed of a material selected from the group consisting of amorphous silicon, crystalline silicon, titanium carbide, boron, titanium nitride, titanium carbo-nitride and mixtures or combinations thereof.

23. The rigid disc substrate of claim 21, wherein a predetermined area of the smoothing layer is texturized sufficiently to prevent stiction.

* * * * *

UNITED STATES PATENT AND TRADEMARK OFFICE
CERTIFICATE OF CORRECTION

PATENT NO. : 5,487,931
DATED : January 30, 1996
INVENTOR(S) : Annacone et al.

It is certified that error appears in the above-indentified patent and that said Letters Patent is hereby corrected as shown below:

Column 15, line 10, "substrate or" should read --substrate of--.

Signed and Sealed this

Twenty-first Day of May, 1996

Attest:

BRUCE LEHMAN

Attesting Officer

Commissioner of Patents and Trademarks